United States Patent Office 3,311,384
Patented Mar. 28, 1967

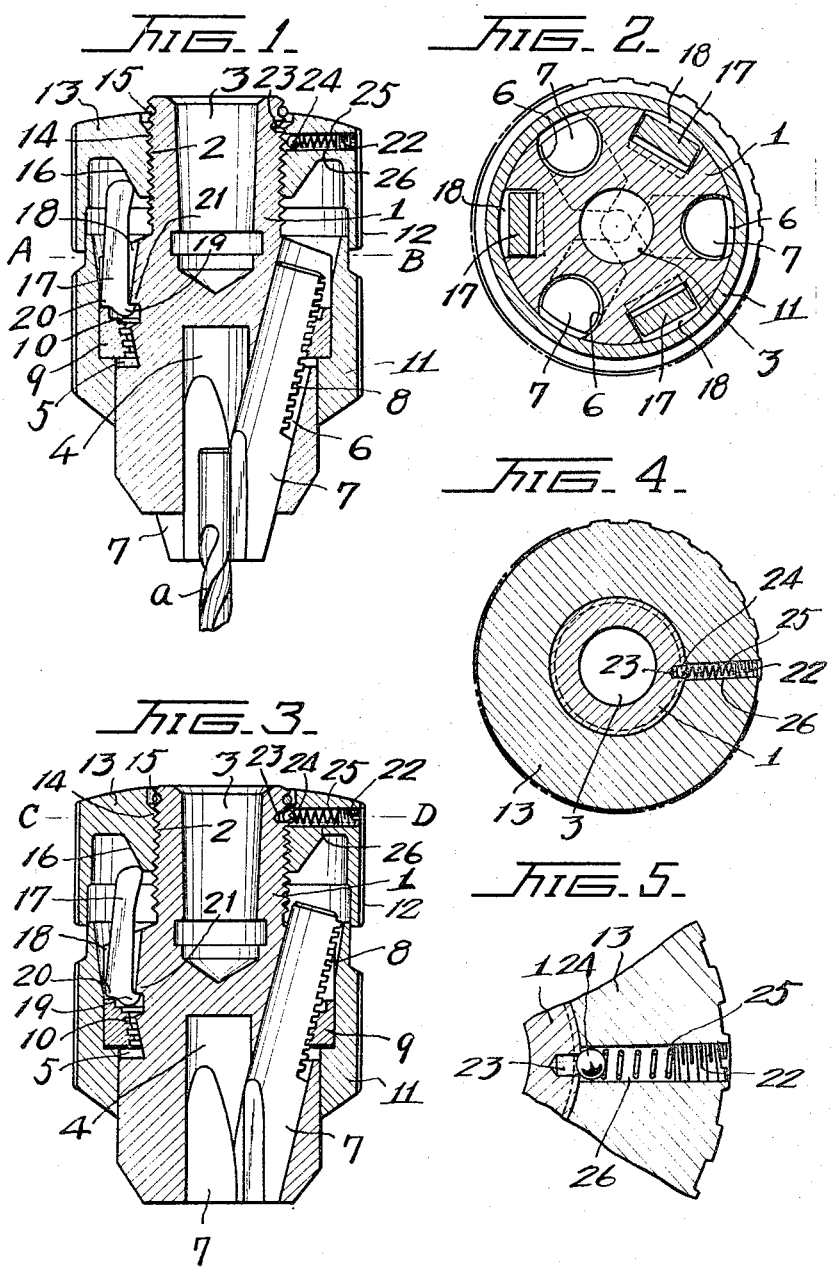

3,311,384
DRILL CHUCK
Kiyoshi Kawasaki, 4619 Shimada-shi, Shizuoka, Japan
Filed Dec. 30, 1964, Ser. No. 422,384
Claims priority, application Japan, Feb. 1, 1964,
39/5,065
2 Claims. (Cl. 279—62)

The present invention relates to an improved drill chuck, and more particularly, to a drill chuck in which a unique leverage principle is utilized for operating the drill chuck.

According to the present invention, there is provided a drill chuck adapted to be operated through the utilization of unique leverage principle in which means for cooperating between a tool holding main body and a screw cap threaded on the main body is provided between the main body and screw cap whereby the main body and screw cap maintain their unison movement relation and turn in unison until clamping jaws have engaged a drilling tool, but when the screw cap is subjected to any external force sufficient to break their unison movement relation above a predetermined level or when the screw cap is turned with a strong force after the clamping jaws have engaged the drilling tool, the main body and screw cap are separated from their unison-movement relation so as to allow only the screw cap to turn thereby to actuate lever bars.

One object of the present invention is to provide a drill chuck in which the drilling tool grasping and clamping operations can be effected in a simple sequential manipulation.

Another object of the present invention is to provide a drill chuck in which the drilling tool removal operation is also effected in a simple and sequential manipulation as in the case of the attaching of the drilling tool to the drill chuck without requiring a considerable amount of manual effort.

These and other objects and the attendant advantages of the present invention will become apparent upon reference to the description of a preferred embodiment illustrated in the accompanying drawings, but it should be understood that the invention is not limited to such an embodiment, but the invention is to be measured solely by the scope of the appended claims.

In the drawings:

FIG. 1 is a longitudinal sectional view of a drill chuck according to the present invention and which shows when the drill chuck firmly clamps a drilling tool therein;

FIG. 2 is a cross-sectional view taken along the line A–B of FIG. 1;

FIG. 3 is a longitudinal sectional view of said drill chuck and which shows when no drilling tool is held in the drill chuck;

FIG. 4 is a cross-sectional view of said drill chuck taken along the line C–D of FIG. 3; and FIG. 5 is a fragmentary view in section of the elements shown in FIG. 4.

Now, referring to the drawings, the main body of a drill chuck of the present invention is generally indicated with reference numeral 1 and as shown, the main body 1 comprises a reduced diameter upper portion whose outer peripheral surface is provided with a male thread portion 2. The upper body portion has an axially extending tapered bore 3 in its center for attaching the drill chuck to a suitable member of a drilling machine. The main body 1 has a larger diameter lower or skirt portion provided with an axially extending bore 4 in its center and the bore 4 is adapted to receive a drilling tool $a$ therein. A peripheral recess 5 is formed around the outer periphery of the main body 1 at a substantially middle portion in the longitudinal direction of the main body and three inclined grooves 6 are formed right below the recess 5 at an equal distance from the center bore 4 in the lower body portion, respectively. The inclined grooves 6 extend along a substantial portion of the center bore 4 and are adapted to slidably guide drill clamping jaws 7, respectively. Each drill clamping jaw 7 is provided with rack teeth 8 on the outer surface of the upper portion of the jaw and the rack teeth are adapted to engage the female screw threads 10 formed on the inner periphery of a tightening ring 9 which is inserted within the peripheral recess 5 for free turning movement as well as upward and downward movement therein. When the tightening ring 9 is turned either in the right or left direction as the case may be, the clamping jaws 7 are caused to move upwardly or downwardly by virtue of engagement of their rack teeth 8 with the female threads 10 on the tightening ring 9. The size of the annular recess 5 should be of such that the recess 5 may maintain a little clearance sufficient to allow the tightening ring 9 to freely move upwardly and downwardly as well as turning movement therein. In case the minimum inner diameter portion of the ring 9 is smaller than that of the uppermost edge of the peripheral recess 5, the ring 9 cannot be inserted within the recess 5, and in such a case the tightening ring 9 is formed with a slit through its whole length so that it may be forced open or the ring 9 may be formed by two half-round members secured together by any suitable means. An outer shell 11 is disposed around the outer periphery of the tightening ring 9 and the outer shell 11 and tightening ring 9 are secured to each other by means of a plurality of set screws or any other suitable means (not shown).

With the above arrangement, when the outer shell 11 is turned in the tightening direction or right direction as seen in FIG. 1, the tightening ring 9 is also caused to turn together with the shell 11 in the same direction as the shell 11. The turning movement of the tightening ring 9 causes the drill clamping jaws 7 which are in engagement with the ring 9 to descend along the guide grooves 6 whereby the jaws 7 may firmly grip the drilling tool $a$. On the other hand, when the outer shell 11 is turned in the opposite or left direction as seen in FIG. 1, the tightening ring 9 follows the movement of the outer shell 11 which in turn causes the clamping jaws 7 to ascend along the inner walls of the guide grooves 6 whereby the jaws may release the drilling tool $a$ therefrom.

An operating screw cap 13 is disposed around the upper reduced diameter portion of the main body 1 and the screw cap 13 is provided with a female thread portion 14 on the inner peripheral surface thereof for thread engagement with the external male thread portion 2 of the upper body portion and with an outer depending covering edge 12 having a cylindrical form. The screw cap 13 is prevented to disengage itself from the upper body portion by means of an annular stopper 15. The outer periphery of the upper body portion is provided with three equally and angularly spaced grooves 18 which reduce their width toward the lower ends for receiving lever bars 17 therein, respectively, and each groove 18 is formed between each two adjacent guide grooves 6. The screw cap 13 is provided with a tapered projection or extension 16. Each lever bar 17 is provided at its lower end with opposite abutment portions 19 and 20 which act in the opposite directions to each other and the lever bar is adapted to operate within its respective corresponding groove 18. The inner abutment portion 19 abuts against the shoulder portion 21 of the main body 1 and the other abutment portion 20 abuts against the inner and upper edge of the tightening ring 9. The upper ends of the lever bars 17 are formed round and the upper round edges abut against the tapered portion or shoulder 16 of the screw cap.

Therefore, when the screw cap 13 is turned in the descending direction, the upper portions of the lever bars 17 are pushed outwardly by means of the tapered portions or extensions 16 of the screw cap 13 which in turn causes the abutment portions 20 of the lever bars 17 to push the tightening ring 9 downwardly and as the ring 9 moves down the ring 9 forces the clamping jaws 7 which are in engagement with the ring 9 to slidably descend to their drilling tool gripping positions.

In the operation, the drill chuck is firstly attached to the drilling machine by means of its center bore 3 in the upper portion and a drilling tool $a$ is inserted into the center bore 4 of the lower body portion. For clamping the drilling tool $a$ in the drill chuck, the outer shell 11 is turned in the right or tightening direction, and the turning of the outer shell 11 in the above-mentioned direction is followed by the turning of the tightening ring 9 in the same direction, and accordingly, the clamping jaws 7 in engagement with the ring 9 descend so as to grip the drilling tool $a$. When it is desired to release the tool $a$ from the drill chuck the outer shell 11 is turned in the opposite direction and the turning of the shell 11 in the opposite direction causes the ring 9 to turn in the same direction as that of the shell which in turn moves the clamping jaws 7 upwardly so as to release the tool $a$ therefrom. As previously described, when the screw cap 13 threaded on the top of the main body 1 is turned in the descending direction, the upper ends of the lever bars 17 are pushed outwardly by means of the inner tapered shoulder 16 of the screw cap and the tightening ring 9 is further pushed down through the lever bars 17 and which in turn causes the clamping jaws 7 to move downwardly so that the lower ends of the clamping jaws may be positively moved to a positive gripping position below the lower body portion whereby the jaws 7 firmly abut against around the tool $a$ so as to grip the tool with a more stronger force reinforced by the leverage action of the lever bars 17.

When the screw cap 13 is turned in the opposite direction, the pushing force acting on the clamping jaws 7 by the lever bars 17 is released therefrom and then the tightening ring 9 is also turned in the opposite direction, and accordingly, the jaws 7 are relieved of the abovementioned compressive force whereby the drilling tool can be easily removed from the drill chuck.

The screw cap 13 is provided in its upper thicker portion with a lateral communication bore 26 (see FIG. 5) which extends through the portion radially and a female thread portion is provided in the lateral bore 26 extending from the outer end to a distance inwardly of the bore 26 for threadably receiving an adjusting screw 22 therein. The upper portion of the main body is provided with a lateral bore 23 which faces the inner end of the communication bore 26 of the screw cap 13 and has a smaller diameter than that of the communication bore 26 of the screw cap 13 and the bore 23 is so positioned that the bore 23 comes into alignment with the screw cap bore 26 when the screw cap 13 is in its uppermost position. The communication bore 26 houses a steel ball 24 having a diameter somewhat larger than that of the main body bore 23 and the steel ball 24 is normally urged against the bore 23 by means of a spring 25 inserted in the communication bore 26. The steel ball 24 is adapted to adjust the communication degree between the bores 23 and 26 by means of an adjusting screw 22 threaded in the bore 26.

With the above arrangement so long as portion of the steel ball 24 is disposed within the main body bore 23, the ball 24 serves to couple the screw cap 13 to the main body 1 whereby the screw cap cannot turn independently of the main body. Accordingly, when the tightening ring 9 is turned while the screw cap 13 is prevented from turning movement independently of the main body, the main body 1 will not turn until the clamping jaws 7 grip the drilling tool $a$ at its periphery, but after the lower ends of the clamping jaws 7 has gripped the tool $a$, the turning movement of the tightening ring 9 will be opposed. Thus, when the tightening ring 9 is further caused to turn against the force opposing its turning movement, the steel ball 24 retreats toward the outer end of the communication bore 26 against the action of the spring 25 to allow the main body 1 to turn, and as a result, the screw cap 13 deepens its thread engagement with the main body 1 by moving down along the axis of the main body thereby to cause the tapered shoulder 16 of the screw cap 13 to push the upper edges of the lever bars 17 outwardly and the abutments 20 of the thus pushed lever bars 17 push the tightening ring 9 downwardly, with a strong force. Therefore, when the tightening ring 9 is sequentially turned as mentioned above it is possible to accomplish that the clamping jaws 7 move downwardly through the lower main body toward the drilling tool $a$ so as to grip the tool $a$ at its periphery, and that such gripping force by the jaws 7 acting on the drilling tool $a$ is reinforced by the compressive action of the lever bars 17, and such gripping and additional compressing operations can be effected in a continuously sequential manipulation.

When the drilling tool $a$ is desired to be removed from the drill chuck, the above procedures are reversed, i.e., the screw cap 13 is turned in the opposite direction to return the same to its uppermost position in which portion of the steel ball 24 is positioned within the main body bore 23 thereby to couple the screw cap 13 to the main body against movement relative to the body. Any further continuous turning movement of the screw cap 13 causes the main body 1 to turn in unison with the screw cap which in turn moves the clamping jaws 7 upwardly from their engagement with the tool $a$ thereby to release the drilling tool $a$ from the jaws 7.

As clear from the foregoing description, the provision of this novel drill chuck enables the drilling tool clamping and releasing operations to be carried out in a continuously sequential and simple manipulation.

Although only one specific embodiment of the present invention has been hereinabove described for purposes of explanation, it will be understood that minor modifications and improvements may be made by those skilled in the art without departing from the scope and spirit of the invention. Accordingly, the present invention is not limited to the precise embodiment illustrated herein, but only by the scope of the appended claims.

What is claimed is:

1. A drill chuck comprising a main body for holding a drilling tool and having equally spaced jaw guiding grooves, a peripheral recess around the body and longitudinal grooves formed between said jaw guiding grooves, a screw cap threaded on the top of said main body, and having a downwardly extending inner extension, said extension having an inner threaded surface for thread engagement with the main body and an outer tapered surface, a tightening ring disposed within said peripheral recess of the main body for free turning movement and having an inner threaded surface, clamping jaws having rack teeth on portions of their outer surfaces for thread engagement with said inner threaded surface of the tightening ring, and a plurality of lever bars 17 disposed in respective longitudinal grooves of the main body and having upper ends abutting against said tapered outer surface of the extension of the screw cap and lower ends abutting against said tightening ring whereby said drilling tool may be firmly gripped by the clamping jaws whose inherent gripping force is reinforced through the leverage of said lever bars, characterized by means cooperating between said main body and screw cap for unison movement or separate movement of the two members whereby when said drilling tool is to be attached to said main body the main body and screw cap maintain their unison movement relation and move in unison until said clamping jaws have engaged the tool, but when the screw cap is further turned with a stronger force after the clamping jaws have engaged the drilling tool the main body and screw cap break their unison movement relation so as to cause only the screw cap to turn whereby independently of the main body the lever bars may be actuated to provide a stronger clamping force to said jaws.

2. A drill chuck as set forth in claim 1, in which said cooperating means comprises a communication bore formed in said screw cap, a lateral bore formed in said main body, a steel ball disposed within said communication bore, a spring disposed within said communication bore and normally urging said steel ball toward said lateral bore of the main body and an adjusting screw for adjusting the force of said spring, said main body bore and screw cap communication bore being so arranged that when the screw cap is in its uppermost position the two bores come into alignment with each other.

References Cited by the Examiner
UNITED STATES PATENTS 3,000,642 9/1961 Kawasaki _____ 279—62
3,096,098 7/1963 Buck _____ 279—123

ROBERT C. RIORDON, *Primary Examiner,*

J. F. McKEOWN, *Assistant Examiner.*